(12) United States Patent
Page

(10) Patent No.: US 10,901,946 B2
(45) Date of Patent: Jan. 26, 2021

(54) DATABASE DIRECTORY USER INTERFACE

(71) Applicant: Alfresco Software, Inc., San Mateo, CA (US)

(72) Inventor: Thomas Page, San Mateo, CA (US)

(73) Assignee: Alfresco Software Ltd.

( * ) Notice: Subject to any disclaimer, the term of this patent is extended or adjusted under 35 U.S.C. 154(b) by 220 days.

(21) Appl. No.: 15/349,592

(22) Filed: Nov. 11, 2016

(65) Prior Publication Data

US 2018/0137138 A1     May 17, 2018

(51) Int. Cl.
*G06F 3/0482*     (2013.01)
*G06F 16/16*     (2019.01)

(52) U.S. Cl.
CPC ................... *G06F 16/168* (2019.01)

(58) Field of Classification Search
CPC ............. G06F 17/30126; G06F 3/0482; G06F 3/0488; G06F 16/168
See application file for complete search history.

(56) References Cited

U.S. PATENT DOCUMENTS

| | | | |
|---|---|---|---|
| 9,007,302 B1 * | 4/2015 | Bandt-Horn | G06F 3/0202 345/156 |
| 2006/0212833 A1 * | 9/2006 | Gallagher | G06T 11/206 715/848 |
| 2011/0066981 A1 * | 3/2011 | Chmielewski | G06F 3/0482 715/834 |

* cited by examiner

*Primary Examiner* — Andrea C Leggett
(74) *Attorney, Agent, or Firm* — Mintz Levin Cohn Ferris Glovsky and Popeo, P.C.

(57) ABSTRACT

A graphical user interface can be generated on a display by a processor. The graphical user interface can be rendered, on a display, with a first circular representation of a directory structure of a first directory of an electronic content management system. The first circular representation can have a hierarchy of levels representative of a hierarchy within the first directory. The first circular representation can be rendered in a display that displays the graphical user interface. A second circular representation of a second directory within the first directory can be generated. The second circular representation of the second directory can have a hierarchy of levels representative of a hierarchy within the second directory. The second circular representation of the second directory can be generated in response to a user input selecting the second directory.

24 Claims, 5 Drawing Sheets

DATABASE DIRECTORY USER INTERFACE

TECHNICAL FIELD

The subject matter described herein relates generally to generating a graphical user interface representing a directory hierarchy.

BACKGROUND

Graphical user interfaces generated to represent directory structures are typically tree hierarchies showing only the hierarchical relationship between directories and files.

SUMMARY

In one aspect, a method is provided for performing one or more operations associated with rendering a graphical user interface that represents a directory structure of a directory of an electronic content management system. The operations can include generating, by one or more physical processors, a graphical user interface on a display. A first circular representation of a directory structure of a first directory of an electronic content management system can be provided. The first circular representation can be provided, by the one or more physical processors, to the graphical user interface. The first circular representation can have a hierarchy of levels representative of a hierarchy within the first directory. The first circular representation can be rendered, by the one or more physical processors, in a display that displays the graphical user interface.

In some variations, the method can include one or more of the following optional elements. A second circular representation of a second directory, within the first directory, can be generated by the one or more physical processors. The second circular representation of the second directory can have a hierarchy of levels representative of a hierarchy within the second directory. The first circular representation can be rendered in a display that displays the graphical user interface. The second circular representation of the second directory can be generated in response to a user input selecting the second directory. The user input can be through a touchscreen.

The first circular representation of the directory structure can be divided into one or more sections. The one or more sections can be representative of one or more directories within the first directory. The one or more sections can be color-coded. Each section, of the one or more sections, can be color-coded based on a type of data in each directory associated with each section.

A key for the first circular representation can be generated. The key can be generated by the one or more physical processors. The key in the graphical user interface can be provided, by the one or more physical processors and to the graphical user interface. The key can be generated for presenting on the display adjacent the first circular representation. The key can be rendered, by the one or more physical processors, in the display that displays the graphical user interface.

A list of one or more files contained with the first directory of the directory structure can be rendered in the graphical user interface adjacent the first circular representation. An identity of the first directory can be rendered in the graphical user interface adjacent the first circular representation.

An electronic input button can be rendered in the center of the first circular representation.

In another aspect a system is provided that includes a display device, a processor and memory. The memory configured to include instructions which, when executed by the processor, can cause the processor to perform one or more operations. The operations can include one or more of the operations described herein.

Implementations of the current subject matter can include, but are not limited to, methods consistent with the descriptions provided herein as well as articles that comprise a tangibly embodied machine-readable medium operable to cause one or more machines (e.g., computers, etc.) to perform operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Tree hierarchies representing folder structures are limited in the information they are able to provide. The presently described subject matter includes generating a graphical user interface including a radial representation of a folder structure. The radial representation of the folder structure can include a presentation of additional information on a display, compared to traditional tree hierarchies. The radial representation of the folder can provide additional functionality compared to traditional tree hierarchies.

Figure 1:
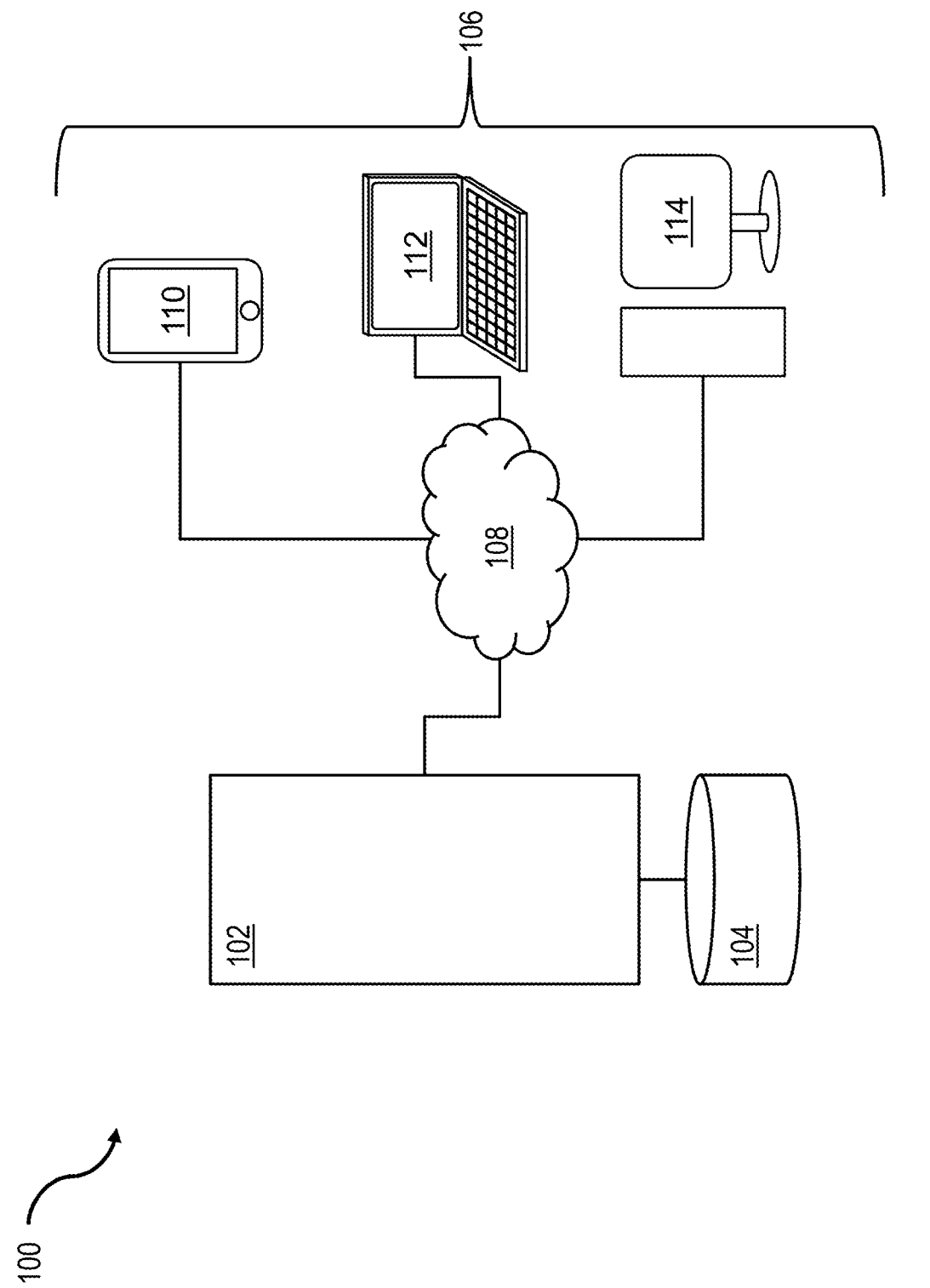
FIG. 1 is a schematic illustration of a system having one or more features consistent with the present description.

FIG. 1 is a schematic illustration of a system 100 having one or more features consistent with the present description. The system can include a server 102. The server 102 can include a memory 104. The server 102 can be part of an electronic content management system. The memory 104 can include a database containing content items managed by the electronic content management system. One or more client devices 106 can be in electronic communication with the server 102 through a network 108, such as the Internet. The one or more client devices 106 can include any type of client device, for example, a smartphone 110, a laptop 112, a desktop 114, or the like.

A client device 106 can include a graphical display. A graphical user interface can be generated for presentation to a user of the client device 106 on the graphical display. A graphical user interface having a radial representation of a folder structure can be generated for display on a client device 106.

Figure 2:
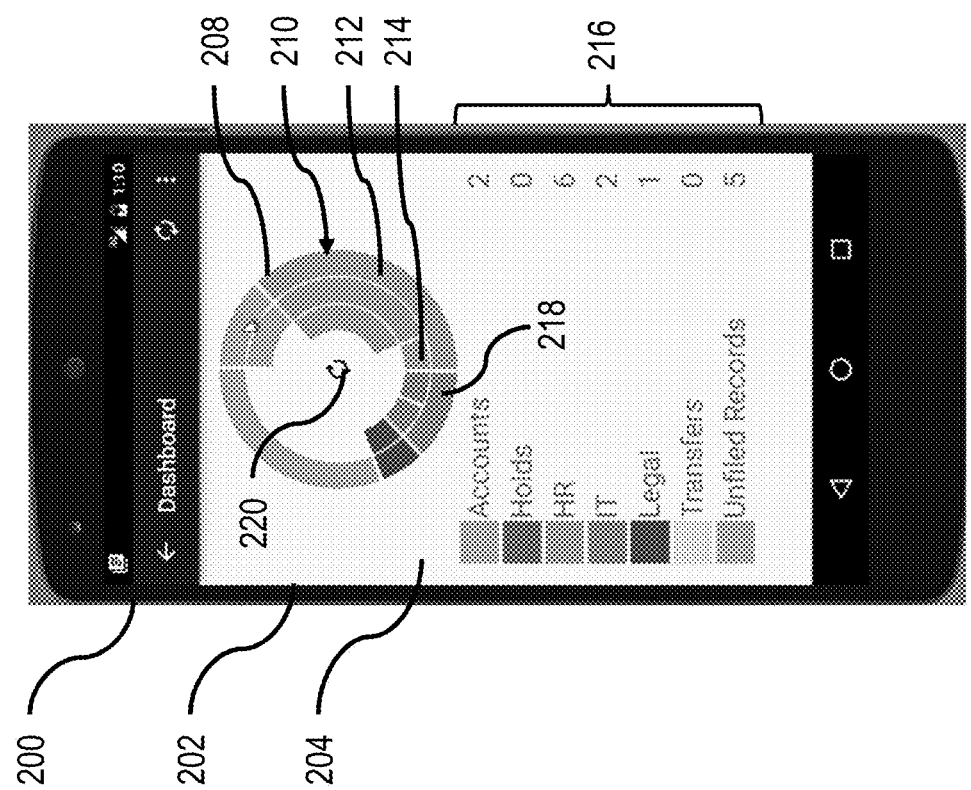
FIG. 2 is an illustration of a client device having one or more features consistent with the present description.

FIG. 2 is an illustration of a client device 200 having one or more features consistent with the present description. The client device 200 can include a display device 202. A graphical user interface 204 can be generated for presentation through the display device 202 of the client device 200.

In some variations, a first circular representation 208 of a directory structure of a first directory of an electronic content management system can be generated and presented on the graphical user interface 204. The first circular representation 208 can include a hierarchy of levels 210 representative of a hierarchy within the first directory. For example, the hierarchy of levels 210 can include a first level 212. In some variations, the first level 212 can represent the highest level of the first directory. In other variations, the first level 212 can represent a selected level of a first directory. The second level 214 can represent a second level of the first directory below the first level.

The circular representation 208 can be generated based on a set of radial coordinates. The set of radial coordinates can be generated based on the content of the first directory. For example, the content of the first directory can include one or more additional sub-directories. The radial coordinates for each section of the circular representation 208 can be based on a characteristic associated with the content of the content items within the first directory. For example, a characteristic associated with the content of the content items can be a content size, a content type, or the like. The sections can be sized proportionally to the size of the content items contained within the first directory.

Individual sub-directories can include content items generally having a particular content type. Content-type can be associated with a business unit within an organization. For example, a particular content type can be financial-type content, human resource-type content, technology-type content, research and development-type content, legal-type content, secret-type content, information-technology-type content, or the like.

Content-type can be associated with a file-type of the files within a directory. For example, executable-type content, document-type content, log-type content, batch file-type content, spreadsheet-type content, database-type content, or the like.

Content-type can be associated with various business divisions. For example, a first business division, a second business division, or the like.

The radial coordinates for a sub-directory can be based on an amount of data within the sub-directory, a frequency of access of the content within the sub-directory, an importance of the data within the sub-directory, a number of read/write actions associated with the data, or the like.

The graphical user interface 204 can include a file list 216. The file list 216 can be a list of files that are within the highest level of directory currently being represented by the first circular representation 208.

The first circular representation 208 of the directory structure can be divided into one or more sections, for example section 218, representative of one or more directories within the first directory. The one or more sections can be color-coded. Each section, of the one or more sections, can be color-coded based on a type of data in each directory associated with each section. For example, in FIG. 2, the directories are color-coded based on the business unit associated with the content.

A user can interact with the graphical user interface 204. For example, a user can select one of the subdirectors within the first circular representation 208 of the directory structure of the first directory, such as subdirectory 218. A user can provide user inputs through one or more peripheral devices associated with a client device 106. In some variations, the user input can include interaction with a touchscreen display of a smartphone, such as smartphone 110 illustrated in FIG. 1. The user input can include an interaction using a pointer, such as a mouse or trackpad pointer, of a laptop, such as laptop 112, or a desktop, such as desktop 114, illustrated in FIG. 1.

In response to the user interaction a second circular representation 214v of a second directory within the first directory can be generated. The second circular representation 214 of the second directory can have a hierarchy of levels representative of a hierarchy within the second directory. The hierarchy can include folder structures, files, or the like.

Figure 3:
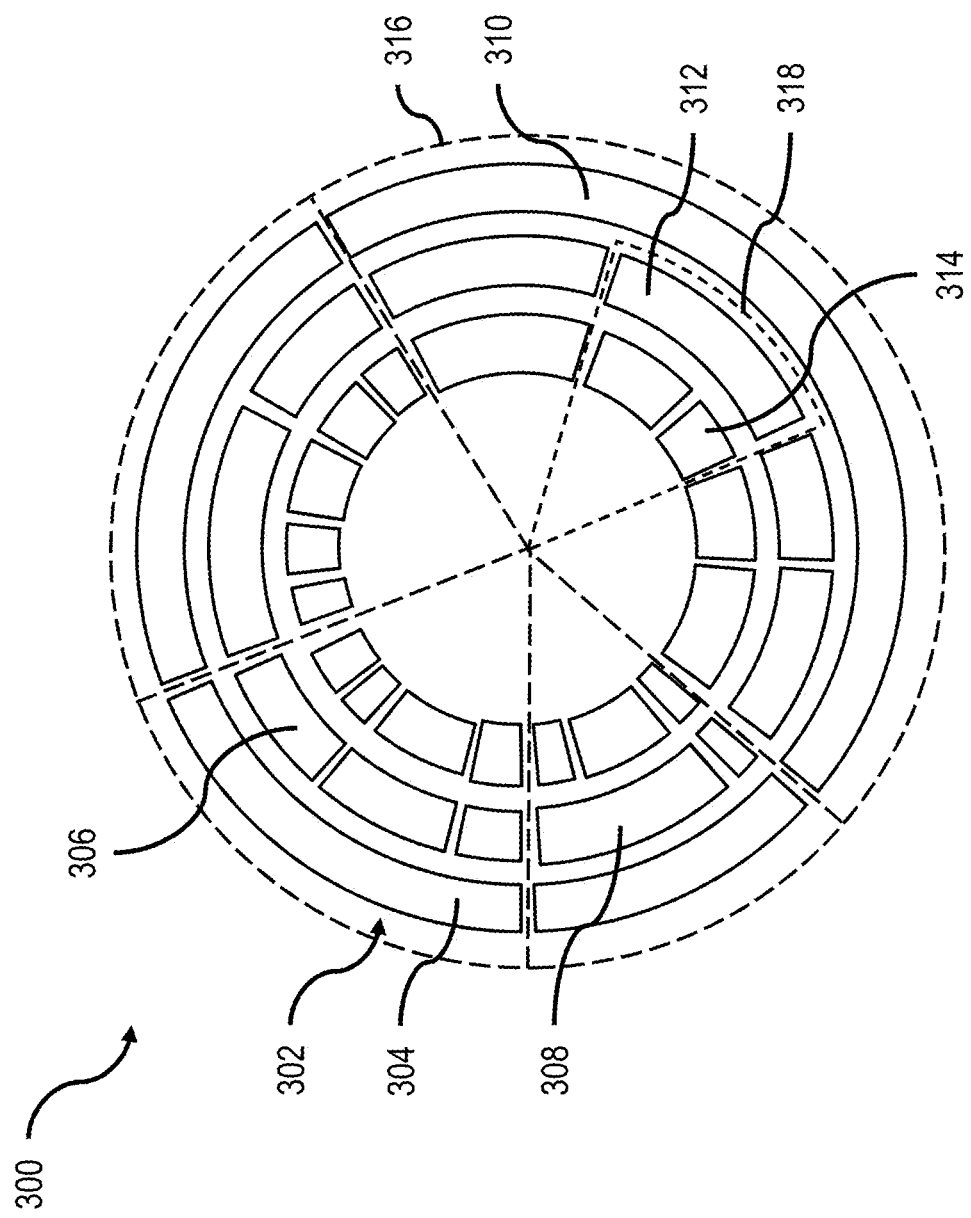
FIG. 3 is an illustration of at least a portion of a graphical user interface having one or more features consistent with the present description.

FIG. 3 is an illustration of at least a portion of a graphical user interface 300 having one or more features consistent with the present description. The at least a portion of the graphical user interface 300 can be presented on a display to a user. The graphical user interface 300 can include a first circular representation 302 of a directory structure of a first directory of an electronic content management system.

The first circular representation 302 can have a hierarchy of levels representative of a hierarchy within the first directory. For example, the first circular representation 302 can include a first level 304 and a second level 306. The first level 304 can represent a first hierarchical level of a directory structure. The second level 306 can represent a second level of the directory structure. Each level of the first circular representation 302 can be divided into one or more sections 308. Each section can represent a folder. A section 308 in the first level 304 can represent a folder in the first hierarchical level of the directory structure. A section 308 in the second level 306 can represent a folder in the second hierarchical level of the directory structure.

In some variations, the second level 306 of the first circular representation 302 can represent the folders and/or content items within the folder represented by the section in the first level 304 of the first circular representation 302. For example, section 310 in FIG. 3 can represent a folder in a first level of a directory structure. Section 312 can represent a folder in a second level of a directory structure, within the folder represented by section 310. Similarly, section 314 can represent a folder in a third level of a directory structure within the folder represented by section 312. The first circular representation 302 can be configured such that each section radially inward of another section represents a folder and/or content item within the folder represented by the outer section. In other words, each portion 316 of the first circular representation 302 can represent folders and/or content items that are all hierarchically related. Similarly, each portion 318 of the first circular representation 302 can represent folders and/or content items that are all hierarchically related.

Figure 4:
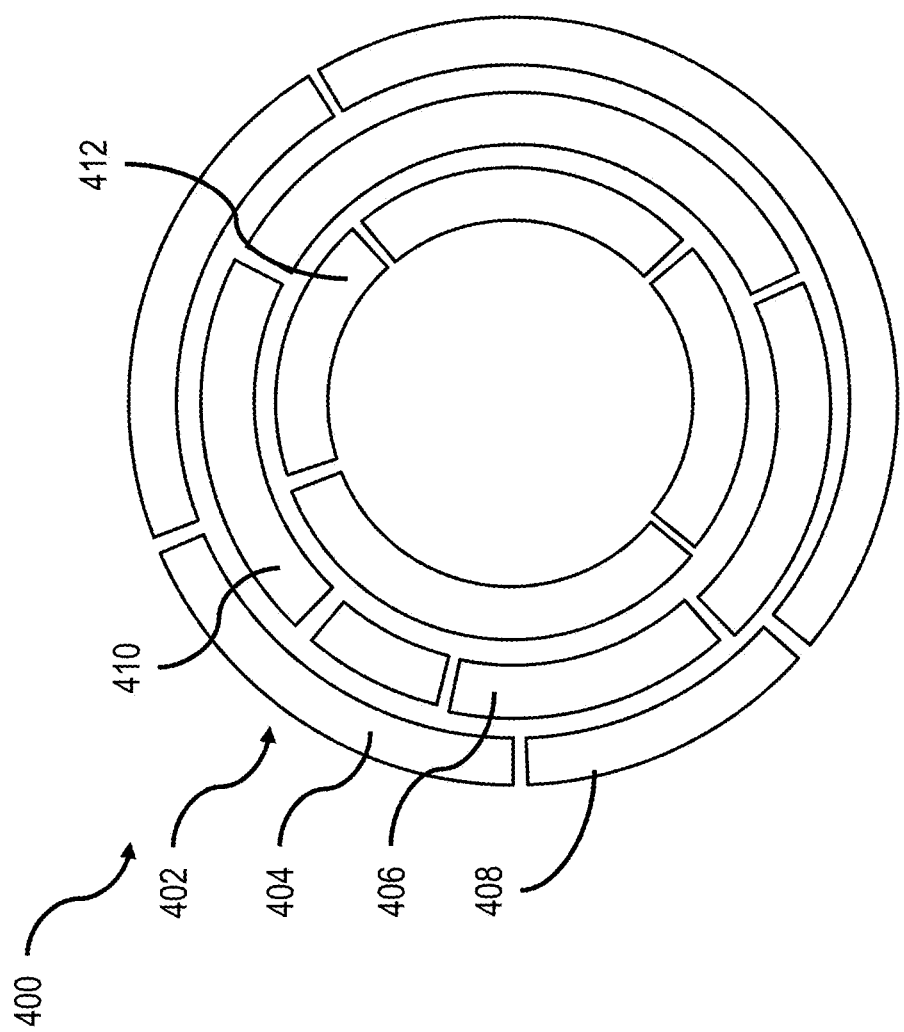
FIG. 4 is an illustration of at least a portion of a graphical user interface having one or more features consistent with the present description.

FIG. 4 is an illustration of at least a portion of a graphical user interface 400 having one or more features consistent with the present description. The at least a portion of the graphical user interface 400 can include a first circular representation 402 of a first directory. The first circular representation 402 of the first directory structure and comprise a plurality of levels that represent folder and/or content items within a hierarchical directory structure. Each level of the first circular representation 402 can represent a hierarchical level within the hierarchical directory structure. The first level 404 of the first circular representation 402 can represent the first hierarchical level of a first directory structure. The second level 406 of the first circular representation 402 can represent the second hierarchical level of the first directory structure.

The second level 406 can represent the folders and/or content items within a folder represented by a selected section 408 in the first level 404 of the first circular representation 402. In response to a user interaction with the graphical user interface 400 selecting the section 408, the folders and/or content items within the folder associated with section 408 can be displayed in the second level 406 of the first circular representation 402. Similarly, in response to a selection of a section 410 in the second level 406 of the first circular representation 402, a third level 412 can be presented in the graphical user interface 402. The third level 412 can represent folders and/or content items in the folder associated with the selected section 410.

In some variations, a key can be generated for the first circular representation. The key can be provided in the graphical user interface 204. The key can be positioned adjacent to the first circular representation 208. In some variations, the key can provide the identity of the first directory associated with the first circular representation 208. In other variations, the identity of the first directory and/or second directory can be incorporated into the first circular representation 208. For example, when a user interacts with a particular segment of the first circular representation 208, the identity of the directory associated with that segment can be presented to the user within the graphical user interface 204. The identity can be presented as an overlay over the segment.

In some variations, the graphical user interface 204 can include an electronic input button 220 disposed within the center of the first circular representation 208. The electronic input button 220 can cause a plurality of functions to be executed. When a user interacts with the electronic input button 220 the graphical user interface 204 can present a plurality of options to the user from which to choose from. The plurality of options can include backing up through a directory, refreshing of the graphical user interface 204, modifying the appearance of the graphical user interface 204, or the like.

In some variations, the graphical user interface 204 can be presented in response to a query. The graphical user interface 204 can facilitate selection of one or more options associated with the graphical user interface 204. The one or more options can include minimum limits for the directories before they are presented on the graphical user interface 204. For example, an option can exist that limits directories including no content items from being presented in the graphical user interface 204.

The graphical user interface 204 can be manipulated to show additional information. For example, the number of hierarchical levels of the first circular representation 208 can be modified. Modification can be facilitated through an interaction, by the user, with the graphical user interface 204. As an example, when the graphical user interface is presented on a display of a smartphone with a touchscreen, the user can use pinch and/or squeeze inputs on the touchscreen display to modify the number of hierarchical levels of the first circular representation 208. In some variations, a graphical user interface 204 can include a slider. A user can interact with the slider to modify the number of hierarchical levels of the first circular representation 208.

Figure 5:
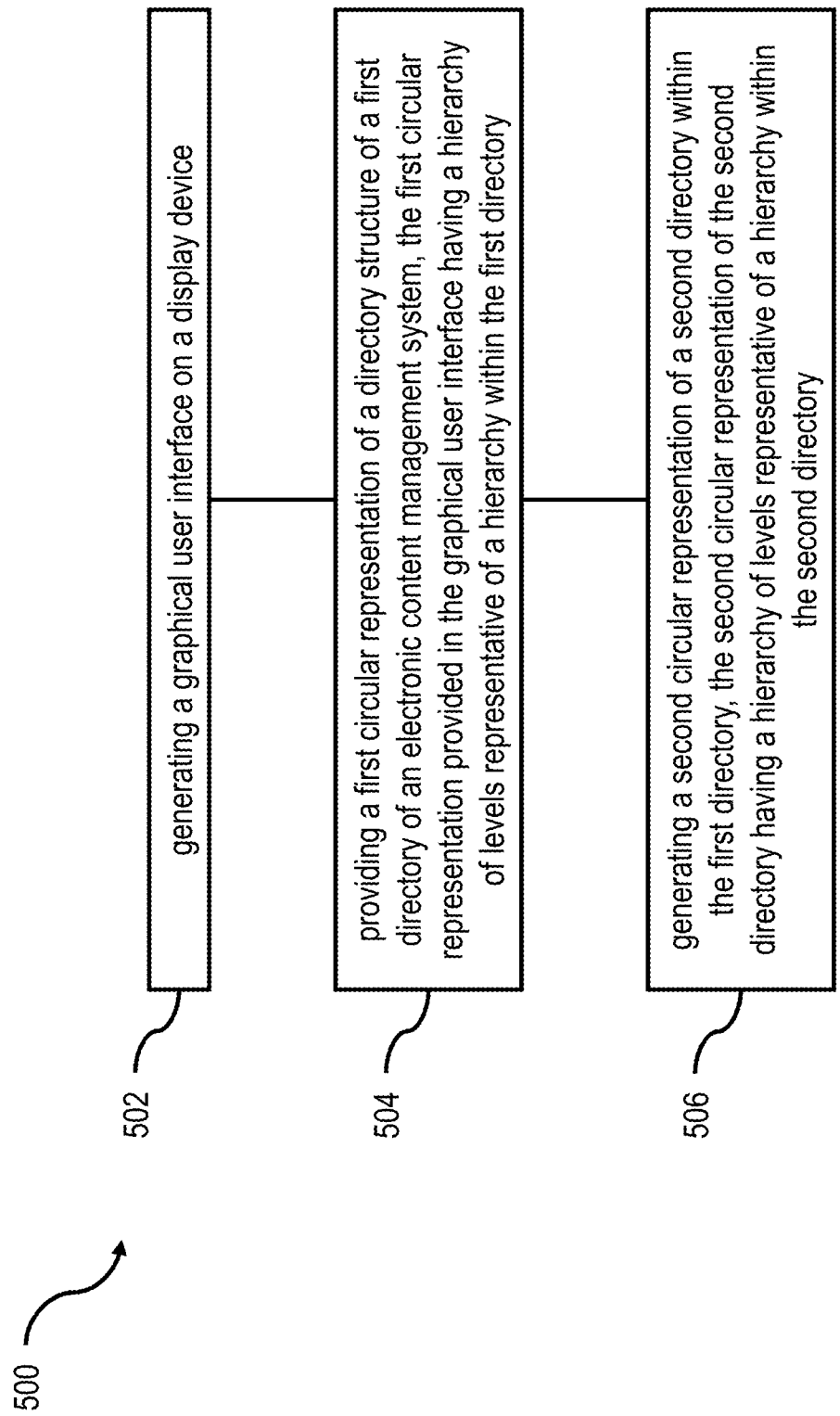
FIG. 5 is an illustration of a method having one or more features consistent with the present description.

FIG. 5 illustrates a method 500 having one or more features consistent with the current description. The operations of method 500 presented below are intended to be illustrative. In some embodiments, method 500 may be accomplished with one or more additional operations not described, and/or without one or more of the operations discussed. Additionally, the order in which the operations of method 300 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At 502, a graphical user interface can be generated on a display device. An example of the graphical user interface is illustrated in FIG. 2. The graphical user interface can be presented on a display device of a client device, such as client device 106.

At 504, a first circular representation of a directory structure of a first directory of an electronic content management system can be provided. The first circular representation provided in the graphical user interface can have a hierarchy of levels representative of a hierarchy within the first directory. The first circular presentation can include a plurality of segments each representing a content type of the content items in the first directory.

At 506, a second circular representation of a second directory within the first directory can be generated. The second circular representation of the second directory can have a hierarchy of levels representative of a hierarchy within the second directory. The second circular representation of the second directory can be generated in response to a user input. The user input can select a subdirectory presented in the first circular representation.

Without in any way limiting the scope, interpretation, or application of the claims appearing herein, a technical effect of one or more of the example embodiments disclosed herein may include providing additional information and functionality to a graphical user interface representing a hierarchy of directories.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of" "A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean "based at least in part on" such that an unrecited feature or element is also permissible.

Other implementations than those described herein may be within the scope of the following claims.

What is claimed is:

1. A computer-implemented method comprising:
   rendering, by the one or more physical processors, a graphical user interface on a display, the graphical user interface including:
   a first circular representation of a directory structure associated with a first directory of an electronic content management system, the first circular representation comprising a first portion having a hierarchy of levels representative of a hierarchy within the directory structure of the first directory, the first portion being defined by a first area within the first circular representation,
   the first portion having radial coordinates such that size of the first portion represents an amount of data within the first directory;
   rendering an electronic input button at a center of the first circular representation to present to a user a plurality of options comprising navigating through different levels of the hierarchy within the directory structure.

2. The method of claim 1, further comprising: rendering a second circular representation of a directory structure associated with a second directory of the electronic content management system, the second circular representation being within the first circular representation and generated in response to user interaction with the second directory.

3. The method of claim 2, the second circular representation comprising at least a second portion including a plurality of the hierarchy of levels of the directory structure of the second directory.

4. The method of claim 2,
a second portion being defined by a second area within the second circular representation such that the second portion is contained within the first portion to represent that at least one directory in the second directory is a sub-directory of the first directory,
wherein the second portion is generated in response to user interaction with the first portion such that radial coordinates of the second portion representing a sub-directory are based on at least an amount of data within the sub-directory.

5. The method of claim 1, wherein the first circular representation of the directory structure is divided into one or more sections, the one or more sections representative of one or more directories within the first directory, the one or more sections including at least the second portion.

6. The method of claim 5, wherein the one or more sections have a size proportional to a size of the one or more directories.

7. The method of claim 5, wherein the one or more sections are color-coded.

8. The method of claim 7, wherein at least one section of the one or more sections is color-coded based on a type of data in a respective directory associated with the at least one section.

9. The method of claim 1, wherein the method further comprises, at least:
rendering a key for the first circular representation and the second circular representation.

10. The method of claim 1, wherein the method further comprise
rendering adjacent the first circular representation, a list of one or more files within the first directory.

11. The method of claim 1, wherein the method further comprises, at least:
rendering adjacent the first circular representation, an identity of the first directory.

12. A computer-implemented system comprising:
a display configured to present a graphical user interface;
a processor; and
memory configured to store instructions which, when executed by the processor, cause the processor to perform one or more operations, the one or more operations comprising:
generating a graphical user interface on the display, the graphical user interface comprising:
a first circular representation of a directory structure associated with a first directory of an electronic content management system, the first circular representation comprising a first portion having a hierarchy of levels representative of a hierarchy within the directory structure of the first directory, the first portion being defined by a first area within the first circular representation, the first portion having radial coordinates such that size of the first portion represents an amount of data within the first directory;
an electronic input button rendered at the first circular representation to present to a user a plurality of options to navigate through a directory based on modifying the appearance of the graphical user interface; and a second circular representation of a directory structure associated with a second directory of the electronic content management system, the second circular representation being within the first circular representation, the second circular representation comprising at least a second portion including a plurality of the hierarchy of levels of the directory structure of the second directory, the second portion being defined by a second area within the second circular representation such that the second portion is contained within the first portion to represent that at least one directory in the second directory is a sub-directory of the first directory,
wherein the second portion is generated in response to user interaction with the first portion such that radial coordinates of the second portion representing a sub-directory are based on at least an amount of data within the sub-directory.

13. The system of claim 12, further comprising:
an input device and wherein the second circular representation of the second directory structure is generated in response to a user input, through the input device, selecting the second directory within the first directory.

14. The system of claim 13, further comprising:
a touchscreen and wherein the user input is through the touchscreen.

15. The system of claim 12, wherein the first circular representation of the directory structure of the first directory is divided into one or more sections, the one or more sections representative of one or more directories within the first directory, the one or more sections including at least the second portion.

16. The system of claim 15, wherein the one or more sections have a size proportional to a size of the one or more directories.

17. The system of claim 16, wherein the one or more sections are color-coded.

18. The system of claim 17, wherein each section, of the one or more sections, is color-coded based on a type of data in each directory associated with each section.

19. The system of claim 12, wherein the operations further comprise at least:
generating a key for the first circular representation and the second circular representation; and,
generating, in the graphical user interface, the key in the graphical user interface adjacent the first circular representation.

20. The system of claim 12, wherein the operations further comprise at least:
rendering, in the graphical user interface and adjacent the first circular representation, a list of one or more files within the first directory.

21. The system of claim 12, wherein the operations further comprise at least:
rendering, in the graphical user interface and adjacent the first circular representation, an identity of the first directory.

22. The system of claim 12, wherein the operations further comprise at least:
rendering, in the center of the first circular representation, the electronic input button to present to a user a plurality of options comprising at least one of backing up through a directory, refreshing of the graphical user interface, or modifying the appearance of the graphical user interface.

23. The system of claim 12, wherein the first portion represents a first folder of a file management system in the first directory, and the second portion represents a second folder of the file managements system contained in the first folder.

24. A computer-implemented system comprising one or more processors configured to:
   render a graphical user interface on a display, the graphical user interface including a first circular representation of a directory structure associated with a first directory of an electronic content management system, the first circular representation comprising a first portion having a hierarchy of levels representative of a hierarchy within the directory structure of the first directory, the first portion having radial coordinates such that size of the first portion represents an amount of data within the first directory,
   render an electronic input button at a center of the first circular representation to present to a user a plurality of options comprising navigating through different levels of the hierarchy within the directory structure; and
   render adjacent the first circular representation, a list of one or more files within the first directory.

* * * * *